Oct. 9, 1956 W. H. MEYER, JR 2,766,442
LEAK DETECTION APPARATUS
Filed Nov. 26, 1952
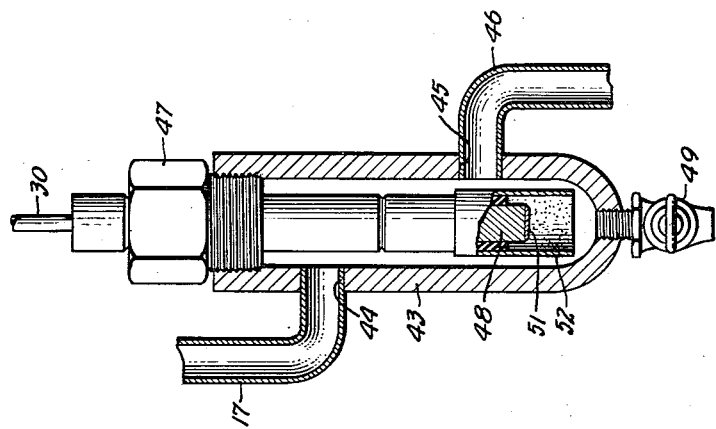
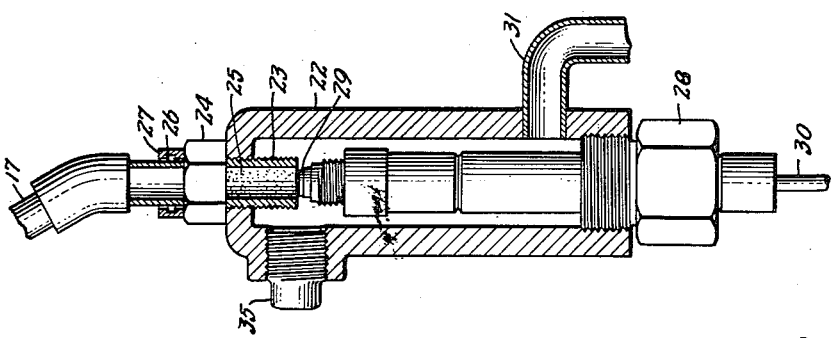
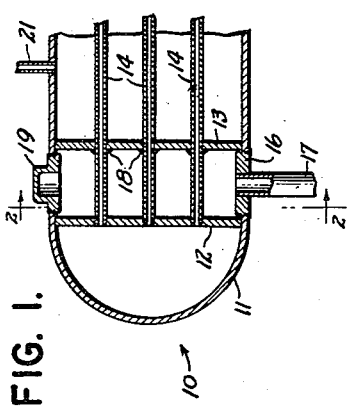
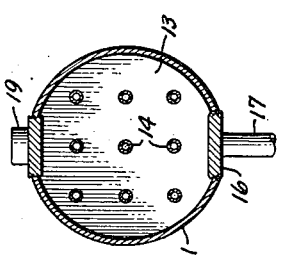
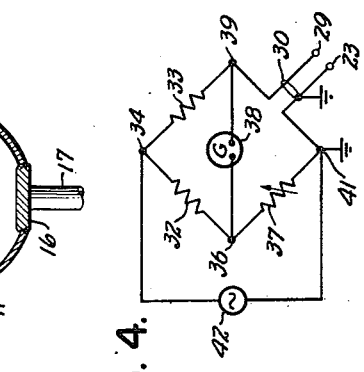
INVENTOR
WILLIAM H. MEYER JR.
BY
Roland A. Anderson
ATTORNEY United States Patent Office 2,766,442
Patented Oct. 9, 1956

2,766,442
LEAK DETECTION APPARATUS

William H. Meyer, Jr., West Mifflin, Pa., assignor, by mesne assignments, to the United States of America as represented by the United States Atomic Energy Commission Application November 26, 1952, Serial No. 322,658

3 Claims. (Cl. 340—242)

The present invention relates to a method and apparatus for detecting leaks in fluid conduits as soon as they occur. The apparatus is particularly useful for promptly detecting fluid leakage from defective joints in composite apparatus, such, for example, as heat exchangers, although it is equally useful in detecting leakage in any apparatus wherein the leaking fluid can be segregated.

The usual method for testing joints between the tubes and sheets in a heat exchanger, for example, is to seal up one end of the unit and to submit the joints to a relatively high air pressure. If the applied pressure decreases, it is evidence of a defective joint. After these conventional tests, the heat exchanger is installed in operation and no other system is used to determine whether joints become defective during operation.

Therefore, if the tested parts of the heat exchanger fail during the operation of the unit, leakage of fluid through the affected parts frequently cannot be discovered until the efficiency thereof is materially affected. By this time, substantial damage may have occurred to the interior of the exchanger. On the other hand, an apparatus capable of carrying out the method of the present invention continuously checks the weakest points of the heat exchanger and immediately discloses the occurrence of a leak. Furthermore, in most cases, the apparatus indicates specifically whether fluid is leaking from the tubes of the exchanger or from the shell.

More particularly, an apparatus embodying the present invention includes a chamber having an electrically grounded housing, a conductivity cell disposed in the chamber, the first electrode of said cell being mounted on the grounded housing of the chamber, the second electrode of said cell being insulated from ground and adjustably spaced from said first electrode, means for measuring a change in conductivity between said first and second electrodes and a conduit communicating at one of its ends with the interior of the fluid-containing structure and at its other end with the interior of said chamber.

It is accordingly an object of the present invention to provide a highly sensitive, promptly acting leak detection apparatus.

A second object of the present invention is to provide a new and improved method and apparatus for the prompt detection of leaks in defective joints of a heat exchanger unit.

Another object is to provide a leak-detecting apparatus which continuously monitors the joints in a heat exchanger after the heat exchanger is installed and operating.

A further object is to provide a new and improved apparatus for leak detection which uses conductivity measuring apparatus for detecting the occurrence of a leak.

The many objects and advantages of the present invention may best be appreciated by reference to the accompanying drawings, the figures of which illustrate apparatus incorporating preferred embodiments of the present invention and capable of carrying out the method of the invention.

In the drawings, Figure 1 is a partial longitudinal sectional view of a double tube sheet heat exchanger unit showing the exchanger joints which are to be monitored for fluid leakage.

Figure 2 is a transverse sectional view of the heat exchanger taken along the line 2—2 of Figure 1.

Figure 3 is a transverse sectional view of a preferred embodiment of a chamber enclosing a salinity cell used in my invention.

Figure 4 is a diagrammatic representation of a Wheatstone bridge measuring circuit for use with the apparatus shown in Figure 3.

Figure 5 is a transverse sectional view of a second preferred embodiment of a chamber and salinity cell.

Referring to Figures 1 and 2, a sectional view of one end of a conventional form of heat exchanger unit is shown. The heat exchanger unit indicated generally by reference 10 includes a shell 11, sheets 12 and 13 and a plurality of tubes 14. Threaded or otherwise secured into the lower portion of the shell 11 is a plug 16 to which is attached a fluid conduit 17. Welded joints between the tubes 14 and the sheets 12 and 13 are indicated by numeral 18. At the upper surface of the shell 11 opposite the plug 16 is a removable plug 19. Also in the upper surface of shell 11 is an inlet conduit 21, an outlet conduit (not shown) being suitably disposed at a spaced location in the shell.

As is well known, for heat exchanger purposes, one fluid is introduced into the tubes 14 while a second fluid, usually used for controlling the temperature of the first fluid, is introduced within the shell 11. During operation of this unit, the more likely source of failure is one of the welded joints 18. When this occurs, fluid enclosed by either a tube 14 or the shell 11 will flow through the joint into the volume between the sheets 12 and 13 and down to the fluid conduit 17.

Referring now to Figure 3, the fluid-sensitive portion of the apparatus will be described. The fluid conduit 17 enters through the upper end of an elongated chamber 22. The lower end of conduit 17 consists of a conducting material such as a metal and has a threaded portion 23 for longitudinal adjustment within chamber 22. This adjustment is controlled by a suitable nut 24. Extraneous fluid is prevented from entering chamber 22 by a gasket 26 and a second nut 27. The threaded end 23 of conduit 17 is preferably coated, either on its threaded surface, or on its inner smooth surface, or on both surfaces, with a highly conductive metal such as platinum or gold, here indicated generally by reference 25. Conduit end 23 serves as the grounded electrode of a conductivity cell as described hereinbelow.

Threaded into the lower portion of chamber 22 is a conductivity cell 28. At the upper end of cell 28 is a second electrode 29. Electrode 29 is also preferably made of a highly conductive metal, and is mounted in insulated relation with respect to the chamber 22. An outlet port 31 is provided for the chamber 22 and a plug 35 is threaded into one side of the chamber. Electrical connections to electrodes 23 and 29 are made through cable 30.

I have found that a conductivity cell that is particularly well suited for use in my leak detection apparatus is a type commonly used with salinity indicating equipment. This equipment measures the salinity of a liquid by immersing two electrodes therein and noting the conductivity between the electrodes. For example, a salinity indicator cell, type CN-9-C, manufactured by the Photoswitch Corporation of Cambridge, Massachusetts, can be used successfully with the present invention. To determine the conductivity of the liquid between the electrodes, they are connected to a suitable measuring circuit. One such conventional measuring circuit, known as a Wheatstone bridge arrangement, is shown in Figure 4. Two resistors of equal magnitude, 32 and 33, are connected at a common terminal 34. The other end of resistor 32 is connected to terminal 36 which in turn is connected to a variable resistor 37 and a galvanometer 38. The other side of resistor 33 is connected to a terminal 39 which in turn is connected to galvanometer 38 and to one electrode 29 of the conductivity cell through cable 30. The remaining terminal 41 is grounded and connected to the other electrode 23. A suitable alternating current potention source 42 is connected across terminals 34 and 41 of the bridge circuit.

Referring now to Figures 1, 3 and 4, a preferred embodiment of the invention will be described. The spacing between electrodes 23 and 29 is adjusted to the desired value by means of adjusting nuts 24 and 27. Removal of plug 35 permits visual inspection of the final setting. The Wheatstone bridge circuit is then balanced by varying resistor 37 until no deflection occurs on galvanometer 38. The apparatus is now ready for operation.

If any of the joints 18 become defective during operation of heat exchanger 10, the resulting fluid leakage will flow between tube sheets 12 and 13 to conduit 17 down to chamber 22. Since the spacing between electrodes 23 and 29 is very small, the first drop of fluid leakage rolling down the walls of conduit 17 will fill the gap between the electrodes. The conductivity between electrodes 23 and 29 will then be abruptly changed, causing an unbalance in the bridge circuit of Figure 4. The resulting bridge circuit output can be used to operate an alarm current or other indicating device. The conductivity measuring apparatus will operate the alarm even if only one drop of fluid leakage reaches the electrodes as the drop will adhere between electrodes because of surface tension.

The heat exchanger illustrated in Figures 1 and 2 is commonly called a double tube sheet type and is often used aboard ships. Since ships usually carry salinity-indicating equipment incorporating the conductivity measuring feature, the present invention may be readily adapted for shipboard use. Further, the salinity of the fluid leakage can be determined from the amount of galvanometer deflection. Therefore, it is possible to tell whether the leak has occurred in the fresh water part of the heat exchanger or the salt water part.

It should be noted that cable 30 can be made any reasonable length and thereby allow galvanometer 38 to be located at a position remote from the operating area of the fluid-containing structure. Therefore, the visual indicator of the present invention can conveniently be incorporated in a control panel with other warning devices.

Referring now to Figure 5, a second preferred embodiment of apparatus incorporating the present invention will be described. In this embodiment, the conduit 17 enters the chamber 43 at inlet port 44 while outlet port 45 and conduit 46 are provided at the opposite side of the chamber. Threaded into the upper portion of chamber 43 is a conductivity cell 47 at the end of which is an electrode 48 preferably coated with a highly conductive metal 51. Electrode 48 is surrounded by and electrically insulated from a grounded cylindrical shell 52 which serves as the other electrode of the conductivity cell. The inner surface of shell 52 is preferably coated with a highly conductive metal.

In this embodiment, fluid leakage entering the chamber 43 through conduit 17 will flow down the inner surfaces of the chamber to the bottom. There will be no appreciable change in conductivity between the electrodes 48 and 52 until the level of the fluid in chamber 43 reaches electrode 48. At that instant, however, an abrupt change in the conductivity between the electrodes will take place with a resulting deflection on galvanometer 38.

This type of indicator is employed when a small amount of fluid leakage is allowable. The predetermined level of leakage can easily be adjusted by threading the conductivity cell 47 into or out of chamber 43. A tap 49 located at the bottom of chamber 43 can be operated as an outlet for accumulated leakage.

It is possible to interconnect a number of different fluid-containing structures with one leak detection apparatus so that a leak will be indicated by the one conductivity cell. Suitable taps can be installed in the conduit 17 for the determination of which fluid structure is faulty.

If it is desired that neither electrode of the conductivity cell be grounded, the embodiments of Figures 3 and 5 may be modified to electrically insulate electrodes 23 and 52 respectively from ground. Instead of being threaded into the chamber, the conductivity cells may be mounted on insulated spacers or by other conventional means that will occur to those skilled in the art. In this case, the conductor in cable 30 which formerly was grounded will now be connected to an ungrounded electrode.

While the salient features of this invention have been described in detail with respect to the two embodiments, it will of course be apparent that numerous modifications may be made within the spirit and scope of this invention, and it is therefore not desired to limit the invention to the exact details shown except insofar as they may be defined in the following claims.

I claim:

1. In combination with a liquid-containing heat exchanger structure having double tube sheets, apparatus for detecting leakage from a defective joint between a tube and a tube sheet, said apparatus comprising means for isolating the leaking liquid within said structure out of contact with the body of the liquid, said means including said double tube sheets and defining a normally liquid-free isolation space, an elongated chamber disposed beneath said structure, a conductivity cell axially disposed in said chamber, the first electrode of said cell being a cylindrical shell, the second electrode of said cell being mounted interiorly of said cylindrical shell and electrically insulated therefrom, means for measuring a change in the conductivity between said first and second electrodes as an indication of liquid leakage into said isolation space and a conduit communicating at one of its ends with the interior of said heat exchanger between said double tube sheets and at its other end with the interior of said chamber.

2. In combination with a liquid-containing heat exchanger having double tube sheets, apparatus for detecting leakage from a defective joint between a tube and a tube sheet, said apparatus comprising, means for isolating the leaking liquid, said means including said double tube sheets and defining a normally liquid-free isolation space, an elongated chamber disposed beneath said heat exchanger, a conduit communicating at one of its ends with the interior of said heat exchanger between said double sheets and communicating at its other end with the interior of said chamber, a conductivity cell axially disposed in said chamber, the first electrode of said cell being insulated from and adjustably spaced from the second electrode, and means for measuring any change in the conductivity between said first and second electrodes as an indication of liquid leakage from a defective joint in said heat exchanger.

3. In combination with a liquid-containing heat exchanger having double tube sheets, apparatus for detecting leakage from a defective joint between a tube and a tube sheet, said apparatus comprising, means for isolating the leaking liquid out of contact with the body of liquid in said heat exchanger, said means including said double tube sheets and defining a normally liquid-free isolation space, a chamber disposed beneath said heat exchanger having an inlet and outlet port, a conductivity cell disposed in said chamber, the first and second electrodes of said conductivity cell being insulated from each other, means for measuring a change in conductivity between said first and second electrodes as an indication of liquid leakage into said isolation space, and a conduit communicating at one of its ends with the interior of said heat exchanger between said double tube sheets and at its other end with the inlet port of said chamber and adapted to convey leaking fluid from said isolating means to said chamber.

References Cited in the file of this patent

UNITED STATES PATENTS

| | | |
|---|---|---|
| 1,678,591 | Fulweiler | July 24, 1928 |
| 1,778,398 | Northrup | Oct. 14, 1930 |
| 2,438,441 | Hollingsworth | Mar. 23, 1948 |
| 2,475,023 | Grimes | July 5, 1949 |
| 2,600,891 | MacNeille | June 17, 1952 |
| 2,610,267 | Yula et al. | Sept. 9, 1952 |